F. JOHN.
APPARATUS FOR INDICATING AND RECORDING PRESSURES EXERTED IN PRESSES.
APPLICATION FILED JAN. 30, 1914.

1,122,239.

Patented Dec. 22, 1914.
2 SHEETS—SHEET 1.

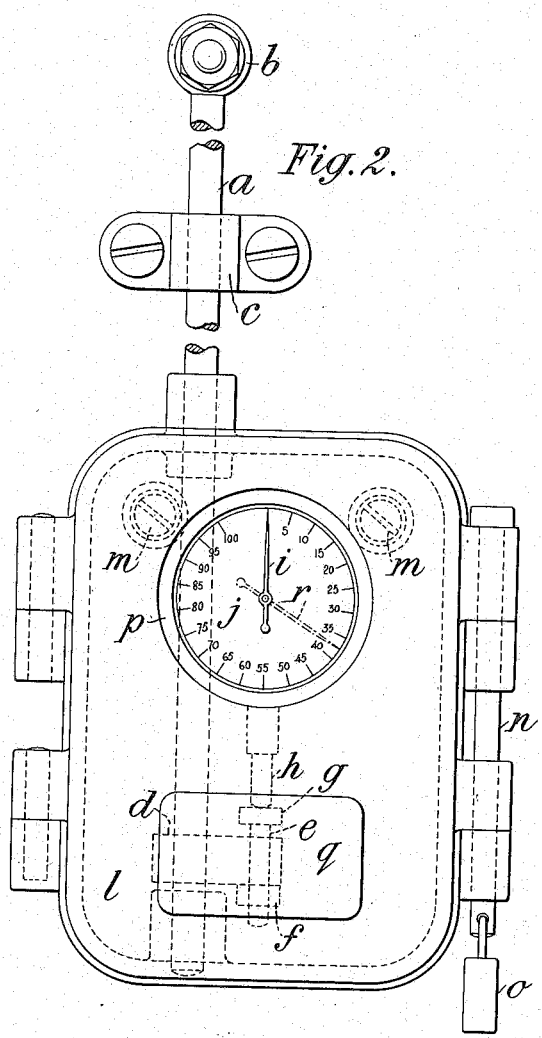
Fig. 2.
Fig. 4.
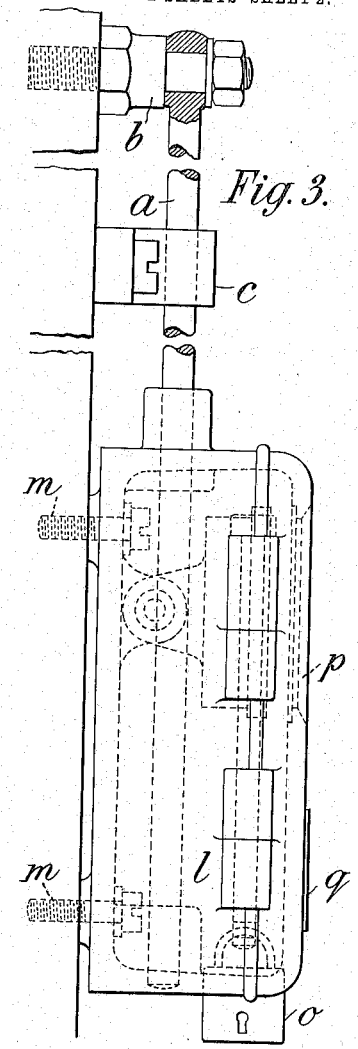
Fig. 3.
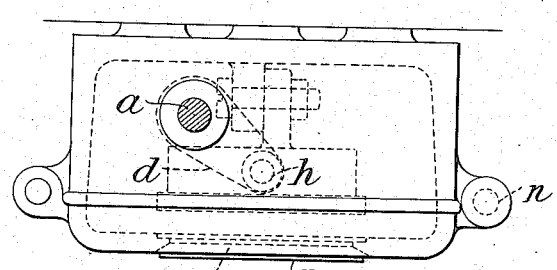
INVENTOR:
Ferdinand John
By Attorneys,
Fraser, Tink & Myers

UNITED STATES PATENT OFFICE.

FERDINAND JOHN, OF ST. OUEN, FRANCE, ASSIGNOR TO E. W. BLISS COMPANY, OF BROOKLYN, NEW YORK, A CORPORATION OF WEST VIRGINIA.

APPARATUS FOR INDICATING AND RECORDING PRESSURES EXERTED IN PRESSES.

1,122,239.     Specification of Letters Patent.     Patented Dec. 22, 1914.

Application filed January 30, 1914. Serial No. 815,388.

*To all whom it may concern:*

Be it known that I, FERDINAND JOHN, a subject of the Emperor of Germany, residing in St. Ouen, Seine, France, have invented certain new and useful Improvements in Apparatus for Indicating and Recording Pressures Exerted in Presses.

In presses for stamping and forging as at present constructed the pressures produced attain considerable values. At the working end of the stroke of the crank-shaft the ratio of the arms of the levers of power and of resistance increases to infinity and allows the belt and the cogs which actuate the press to transmit an effort very superior to that which the frame, the shaft or the other parts of this press can support. As the workman who mounts the tools upon a machine has no means of taking account of the pressures developed he runs the risk of bringing about the rupture of the frame or the bending or torsion of the shaft.

The present invention has for an object the remedying of these troubles by allowing the workman to know at each instant the effect developed, and to avoid, consequently reaching dangerous value.

This invention relates to a device for indicating the effort developed at each instant by a press by measuring the elongation of the frame thereof, or the displacement of one portion of the frame relatively to another portion under the effort of the pressure produced.

Figure 1:
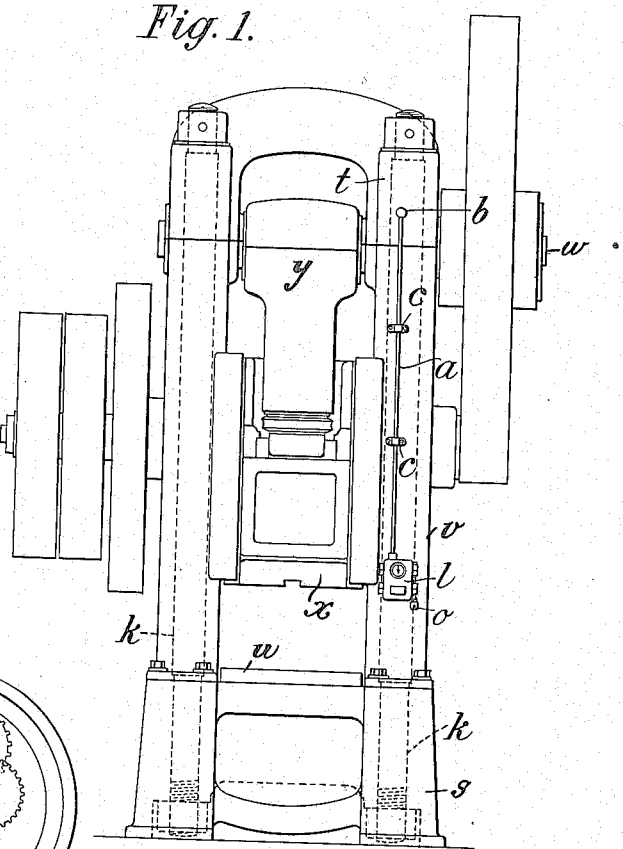
Figure 5:
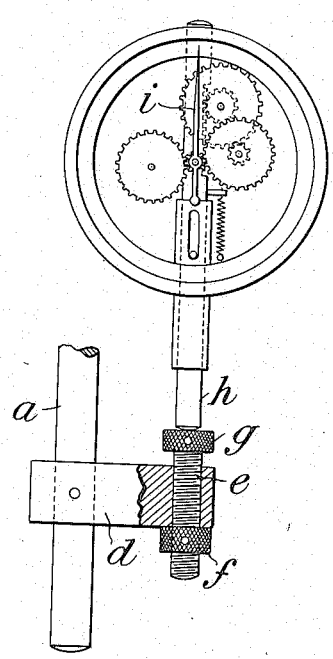

The invention is represented, but only by way of example, in the annexed drawing, in which;

Figure 1 is an elevation of the ensemble of the device applied to a stamping press. Fig. 2 is a face view, on a larger scale, of the indicating device. Fig. 3 is a side view and Fig. 4 a corresponding view in plan. Fig. 5 represents the indicator open.

My improvement is illustrated herein in connection with a press, the base portion $s$ of which is shown carrying the bed plate $u$ of the press. Standards $v$ are shown bolted to the base $s$ and between the upper portion $t$ and the standards $v$ a bearing is provided for the crank shaft $w$ which operates the slide or movable member $x$ of the press in its coöperation with the bed plate $u$. The movable member $x$ is shown connected to the crank shaft by means of a suitable connecting member $y$. In operation the pressure exerted by the crank shaft between the members $x$ and $u$ will tend to elongate the frame of the press which is shown connected together by means of tie-bolts $k$ whereby in the working of the press the portion carrying the bearing for the crank shaft, and particularly the upper portion $t$ thereof, is movable relatively to the base portion $s$. A rod $a$ is shown connected to the upper portion $t$ of the press by means of an attaching member $b$. See particularly Fig. 3. This rod is shown passing through a number of guides $c$ for maintaining it absolutely rectilinear.

Upon the lower portion of the rod is rigidly fixed an arm $d$ (Fig. 5). Into this arm is screwed a bolt $e$ provided with a counter-nut $f$, which permits of rendering the bolt immovable at the position desired in the arm $d$. The head $g$ of this bolt acts upon a rod $h$ which furnishes a rack meshing with the wheel controlling an indicating mechanism comprising a hand $i$ which is displaced in front of a dial $j$. This dial carries a graduation, the divisions of which correspond to various elongations of the frame. The train of toothed wheels transmitting the movement of the rack to the hand is designed to enlarge this movement so as to render it easily readable upon the dial $j$. At each stroke of the press the frame elongates. In the case of the press represented, the frame of which is formed of several pieces of cast iron assembled by long internal stays $k$ (Fig. 1) with screws at their extremities, these stays elongating from below upward. The elongation is maximum at the point where the stop $b$ is fixed. This stop rising with the upper part of the frame carries along the rod $a$. The lower part of this rod, through the intermediation of the cross-piece $d$ and the bolt $e$, raises the rod $h$ and its rack actuates the train of toothed wheels and causes the indicating hand to turn. The dial $j$ being suitably graduated there can be read upon this dial the tension to which the stays are subjected, a tension which is equal to the pressure which the slide of the press exerts upon the object to be worked.

The lower portion of the rod $a$, and all the parts which produce movement in the hand $i$, are inclosed in a box $l$ fastened by means of screws $m$ (Fig. 3) upon the frame of the press at a point well in sight of the workman. This box can be opened when it is desired to clean or lubricate its internal parts. In order that these latter may be protected from mutilation through malice or any other reason, the opening of the box is prevented at ordinary times by a bar $n$ with a padlock $o$ the key of which remains in the possession of the foreman or chief of the workshop of the factory.

The front of the box $l$ shows in front of the dial $j$ a glass opening $p$; below there is fixed a metal plate $q$ upon which, as Fig. 2 indicates, there is engraved the number of the press, the pressure which represents the experimental load which has served to test the solidity of the press and the normal limit pressure which should not be exceeded in use. In order to be able to verify whether, in the course of the work, this normal limit pressure has not been attained or exceeded, there is arranged upon the same axis of rotation as with the hand $i$ a second hand $r$ (Fig. 2) which can be carried along by the hand $i$, but which stops at the point of the dial which this latter has reached, without returning like it to the zero of the division of this dial. It is then easy by means of this second control hand to see what is the highest pressure which has been reached during a certain work; by opening the box this second hand can be set back to zero.

As is usual with manometers there can be marked upon the dial $j$, by a red line plainly visible, the normal limit pressure which is not to be exceeded. Besides this indication of limit pressure of safety it is understood that the dial which carries the graduation from zero to this limit pressure and beyond can serve for the regulation of the press for causing it to give any pressure whatever comprised between zero and its limit pressure. The bolt $e$, variable in position, serves, at the time of setting up the device, for correcting the strains which might prevent the hand $i$ from returning to zero when at rest.

Of course the invention is applicable to all other machines besides the press represented, the frame being capable also of being of a single piece or of several pieces.

The arrangements described are given only by way of example; the shapes, dimensions and arrangements of detail can vary according to circumstances without changing the principle of the invention.

Summing up, the invention has for its object:—

1. In a device of the character specified the combination with a press frame having a portion which is movable relatively to another portion thereof responsive to the working pressure of the press, an indicator carried by one of the said frame portions and a rod having one end fastened to the other of the said frame portions, and the other end operatively connected to the indicator.

2. The combination with a press comprising a frame having a base portion, the bed plate of the press carried thereby and an upstanding portion formed with a shaft-bearing, a crank shaft mounted in such bearing, the movable member of the press coöperative with the bed plate carried by such crank-shaft, the said bearing portion being movable relatively to the base portion incident to the working of the press, an indicator carried by one of the said portions, and a rod having one end fastened to the other of the said portions, and operatively connected to the indicator.

In witness whereof, I have hereunto signed my name in the presence of two subscribing witnesses.

FERDINAND JOHN.

Witnesses:
ARTHUR WILZIE,
HANSON C. COXE.